(12) United States Patent
Shaffer et al.

(10) Patent No.: US 8,102,991 B2
(45) Date of Patent: Jan. 24, 2012

(54) METHOD AND SYSTEM FOR AUTOMATIC CALL DISTRIBUTION

(75) Inventors: Shmuel Shaffer, Palo Alto, CA (US); Joseph F. Khouri, San Jose, CA (US); Gebran G. Chahrouri, Menlo Park, CA (US); Labhesh Patel, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 2267 days.

(21) Appl. No.: 10/937,595

(22) Filed: Sep. 9, 2004

(65) Prior Publication Data

US 2006/0050864 A1    Mar. 9, 2006

(51) Int. Cl.
*H04M 3/00* (2006.01)

(52) U.S. Cl. ......... 379/265.02; 379/265.13; 379/265.04; 379/266.01; 379/266.04; 379/309; 379/265.01; 379/265.05; 379/265.06

(58) Field of Classification Search ............. 379/265.02, 379/265.13, 309, 266.01, 266.04, 265.04, 379/265.14
See application file for complete search history.

(56) References Cited

U.S. PATENT DOCUMENTS

| | | | |
|---|---|---|---|
| 5,036,535 A * | 7/1991 | Gechter et al. ........... 379/265.11 |
| 5,214,688 A * | 5/1993 | Szlam et al. ............. 379/266.08 |
| 5,526,416 A | 6/1996 | Dezonno et al. ............. 379/265 |
| 5,724,420 A | 3/1998 | Torgrim ........................ 379/372 |
| 5,802,155 A * | 9/1998 | Garland et al. .......... 379/106.09 |
| 5,991,645 A | 11/1999 | Yuen et al. ..................... 455/568 |
| 6,005,865 A | 12/1999 | Lewis et al. .................... 370/398 |
| 6,061,363 A | 5/2000 | Evans et al. .................... 370/467 |
| 6,195,364 B1 | 2/2001 | Brodigan ....................... 370/463 |
| 6,295,354 B1 | 9/2001 | Dezonno ........................ 379/266 |
| 6,307,929 B1 * | 10/2001 | Baiyor et al. ............ 379/211.02 |
| 6,347,133 B1 * | 2/2002 | Galbreath .................... 379/67.1 |
| 6,408,061 B1 | 6/2002 | Donak et al. .................. 379/188 |
| 6,546,097 B1 | 4/2003 | Peltz ........................ 379/265.07 |
| 6,567,399 B1 | 5/2003 | Schuster et al. .............. 370/352 |
| 6,633,635 B2 | 10/2003 | Kung et al. .............. 379/215.01 |
| 6,728,338 B1 * | 4/2004 | Kampmeier et al. ........... 379/35 |
| 6,801,520 B2 * | 10/2004 | Philonenko ................... 370/351 |
| 6,829,250 B2 | 12/2004 | Voit et al. ...................... 370/467 |
| 6,920,144 B2 | 7/2005 | Niermann ...................... 370/401 |
| 6,938,080 B1 | 8/2005 | Kahveci et al. ............... 709/223 |
| 7,013,005 B2 * | 3/2006 | Yacoub et al. ............ 379/265.13 |
| 7,089,285 B1 | 8/2006 | Drell ............................. 709/204 |
| 7,120,139 B1 | 10/2006 | Kung et al. .................... 370/352 |
| 7,123,700 B1 | 10/2006 | Weaver, III et al. ........ 379/88.19 |
| 2002/0087693 A1 | 7/2002 | Marshall et al. .............. 709/226 |
| 2002/0114274 A1 | 8/2002 | Sturges et al. ................. 370/229 |

OTHER PUBLICATIONS

U.S. Appl. No. 10/428,401, entitled, "*Method and System for Automatic Contact Distribution Utilizing Presence Detection,*" 30 pages specification, claims and abstract, 2 pages of drawings, inventors Shmuel (nmi) Shaffer et al, May 2, 2003.

* cited by examiner

*Primary Examiner* — Curtis Kuntz
*Assistant Examiner* — Yosef K Laekemariam
(74) *Attorney, Agent, or Firm* — Baker Botts L.L.P.

(57) ABSTRACT

A method for automatic call distribution includes detecting that a first agent is communicating on a first call and detecting that the first call involves a predefined low priority communication. The method includes transitioning the first agent to an on-call ready state based on the first call. The on-call ready state indicates that the first agent is ready to receive an additional call while communicating on the first call.

22 Claims, 2 Drawing Sheets

METHOD AND SYSTEM FOR AUTOMATIC CALL DISTRIBUTION

TECHNICAL FIELD OF THE INVENTION

This invention relates in general to communication systems and, more particularly, to a method and system for automatic call distribution.

BACKGROUND OF THE INVENTION

Automatic call distributors (ACDs) are specialized systems designed to match incoming requests for service, for example a telephone call or an e-mail, with a resource that is able to provide that service, for example a human call center agent. Automatic call distributors generally perform one or more of the following functions: (i) recognize and answer incoming calls; (ii) review database(s) for instructions on what to do with a particular call; (iii) using these instructions, identify an appropriate agent and queue the call, often times providing a prerecorded message; and (iv) connect the call to an agent as soon as the agent is available.

Agents in call centers utilizing ACDs receive incoming customer calls routed to them by the ACD, or they place call center related calls to customers. In either case, whenever an agent is engaged in a call, the ACD system marks him as being in a "talking" state. Once the agent is identified to be in a talking state, the ACD system will not transfer any new calls to the agent. Agents are expected to be available for ACD or call center incoming and outgoing calls when they are "on the job."

"Informal" call centers employ agents for many tasks other than call center activities. Usually the incoming call load into an informal call center is low, and agents may have greater freedom to use their phones. A problem may arise when an agent is talking on a low priority personal call and the call center or ACD receives an incoming call. If all agents are busy on lower priority private calls, the call center or ACD will queue the call and thus the level of service to customers will be reduced. In a specific case when the caller wants to speak to a specific agent, the caller may be queued until the agents frees up from his low priority call. Current call center and ACD systems move an agent into a "not ready" state once they detect that the agent's phone or endpoint is in an offhook state. Once an agent is marked as being in the not ready state, the call center or ACD system will not route incoming calls from customers to this agent until the agent hangs up and his state transitions to a "ready" state.

SUMMARY OF THE INVENTION

The present invention provides a method and system for automatic call distribution that substantially eliminates or reduces at least some of the disadvantages and problems associated with previous methods and systems.

In accordance with a particular embodiment of the present invention, a method for automatic call distribution includes detecting that a first agent is communicating on a first call and detecting that the first call involves a predefined low priority communication. The method includes transitioning the first agent to an on-call ready state based on the first call. The on-call ready state indicates that the first agent is ready to receive an additional call while communicating on the first call.

The method may include receiving a second call for connection with an agent and distributing the second call to the first agent while the first agent is in the on-call ready state. Distributing the second call to the first agent may comprise alerting the first agent of the second call through an on-call ready ring. The on-call ready ring may extend for a longer period of time than a ring alerting a ready agent of an incoming call when the ready agent is not in the on-call ready state.

Detecting that the first call involves a predefined low priority communication may comprise receiving an indication from the first agent through an agent interface that the first call involves a predefined low priority communication, automatically detecting that the first call involves a predefined low priority communication or receiving a command from the first agent through an agent interface to transition the first agent to the on-call ready state.

The method may also include receiving a second call for connection with an agent and determining whether there is a second agent in a ready state. The ready state may indicate that an agent is not communicating on a call and is ready to receive a call. If it is determined that there is a second agent in a ready state, the second call may be distributed to the second agent in the ready state. If it is determined that there is not a second agent in a ready state, the second call may be distributed to the first agent while the first agent is in the on-call ready state. The first call may comprise a non-business call. The method may include automatically transitioning the first agent from the on-call ready state to a ready state when the first call is terminated.

In accordance with another embodiment, an automatic call distribution system includes a presence server operable to detect that a first agent is communicating on a first call and a processor operable to detect that the first call involves a predefined low priority communication. The presence server is operable to transition the first agent to an on-call ready state based on the first call. The on-call ready state indicates that the first agent is ready to receive an additional call while communicating on the first call.

Technical advantages of particular embodiments of the present invention include the use of an on-call ready state to indicate that an agent is ready to receive and handle incoming calls despite currently communicating on another lower priority call. Moreover, call distribution may be prioritized to agents in a ready state first and then to agents in the on-call ready state. Accordingly, agent availability and productivity may be increased thus saving time and labor expense as agents communicating on non-business or personal calls may remain available to receive and handle customer or business-related calls.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
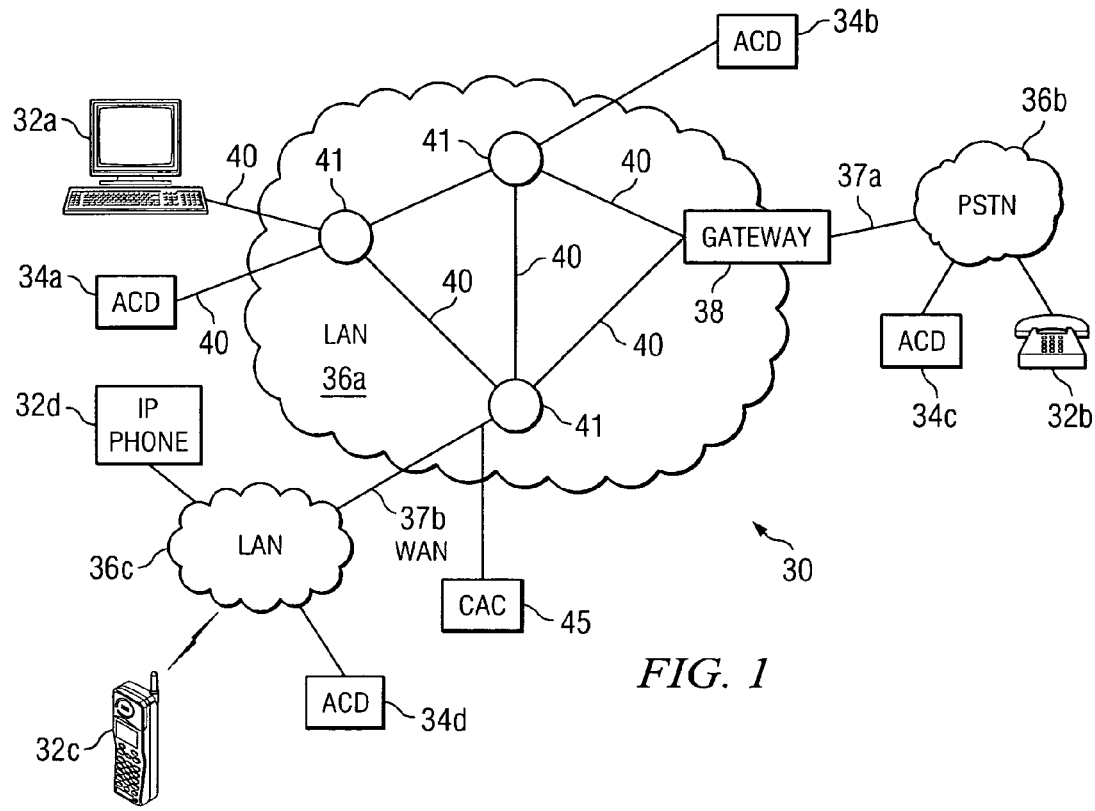
FIG. 1 illustrates a communication system including a plurality of endpoints operable to communicate among each other and a plurality of automatic call distributors, in accordance with a particular embodiment of the present invention.

FIG. 1 illustrates a communication system 30 including a plurality of endpoints 32a-32d having the ability to establish communication sessions between each other and/or automatic call distributors 34a-34d, using one or more of communication networks 36a-36c. Automatic call distributors are specialized communication systems designed to route incoming calls to available agents, so that calls are properly and/or evenly distributed. For the purposes of this specification, "automatic call distributor" shall refer to any combination of hardware, software and/or embedded logic which is operable to automatically distribute incoming calls, and "calls" shall include requests for service transmitted using any audio and/or video means, including signals, data or messages transmitted through voice devices, text chat, web sessions, facsimile, instant messaging and e-mail. Automatic call distributors may include call centers that receive incoming customer calls for distribution to agents and that place calls from agents to customers.

In the illustrated embodiment, incoming calls are routed to an automatic call distributor of a communication system. The calls are distributed to agents able to service the automatic call distributor. However, at times an agent may be communicating on another, lower priority or non-business related call. The teachings of the present invention provide a system and method for automatic call distribution that recognizes an "on-call ready" state so that incoming business calls may still be distributed to an agent communicating on a lower priority or non-business related call.

In the illustrated embodiment, communication network 36a is a local area network (LAN) that enables communication between a plurality of endpoints 32a-32d and automatic call distributors 34a-34d distributed across multiple cities and geographic regions. In another embodiment, a single, central automatic call distributor may be used, which distributes incoming calls to agents distributed across multiple cities and geographic regions. Communication network 36b is a public switched telephone network (PSTN) and couples endpoint 32b and automatic call distributor 34c with communication network 36a through gateway 38. Communication network 36c is another LAN, which couples endpoints 32c and 32d and automatic call distributor 34d with communication network 36a. Accordingly, users of endpoints 32a-32d and automatic call distributors 34a-34d can establish communication sessions between and among each network component coupled for communication with one or more of networks 36a-36c. Communication links 37a and 37b couple communication networks 36a and 36b, and communication networks 36a and 36c, respectively. In the illustrated embodiment, communication link 37b is a wide area network (WAN), which couples LANs 36a and 36c. A call admission control (CAC) system 45 may be used to monitor the amount of bandwidth available over WAN 37b.

Communication network 36a includes a plurality of segments 40 and nodes 41 that couple endpoint 32a with automatic call distributors 34a and 34b, gateway 38, and communication networks 36b-36c. Therefore, a user of endpoint 32a is provided with access to endpoints 32b-32d, and automatic call distributors 34a-34d. Nodes 41 may include any combination of network components, gatekeepers, call managers, routers, hubs, switches, gateways, endpoints, or other hardware, software, or embedded logic implementing any number of communication protocols that allow for the exchange of packets in communication system 30.

Although the illustrated embodiment includes three communication networks 36a-36c, the term "communication network" should be interpreted as generally defining any network capable of transmitting audio and/or video telecommunication signals, data, and/or messages, including signals, data or messages transmitted through text chat, instant messaging and e-mail. Any one of networks 36a-36c may be implemented as a local area network (LAN), wide area network (WAN), global distributed network such as the Internet, Intranet, Extranet, or any other form of wireless or wireline communication network. Generally, network 36a provides for the communication of packets, cells, frames, or other portions of information (generally referred to as packets herein) between endpoints 32a-32d. Communication network 36a may include any number and combination of segments 40, nodes 41, endpoints 32a-32d, and/or automatic call distributors 34a-34d.

In a particular embodiment, communication network 36a employs voice communication protocols that allow for the addressing or identification of endpoints, nodes, and/or automatic call distributors coupled to communication network 36a. For example, using Internet protocol (IP), each of the components coupled together by communication network 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, or other data using frames or packets, are included within the scope of the present invention.

Network 36a may be directly coupled to other IP networks including, but not limited to, another LAN, or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36b through gateway 38. PSTN 36b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, endpoint 32d, automatic call distributors 34a-34b, and gateway 38 are IP telephony devices. IP telephony devices have the ability of encapsulating a user's voice (or other input) into IP packets so that the voice can be transmitted over network 36a. IP telephony devices may include telephones, fax machines, computers running telephony software, nodes, gateways, or any other device capable of performing telephony functions over an IP network.

It will be recognized by those of ordinary skill in the art that endpoints 32a-32d, automatic call distributors 34a-34d, and/or gateway 38 may be any combination of hardware, software, and/or encoded logic that provides communication services to a user. For example, endpoints 32a-32d may include a telephone, a computer running telephony software, a video monitor, a camera, an IP phone, a cell phone or any other communication hardware, software, and/or encoded logic that supports the communication of packets of media (or frames) using communication network 36a. Endpoints 32a-32d may also include unattended or automated systems, gateways, other intermediate components, or other devices that can establish media sessions. Although FIG. 1 illustrates a particular number and configuration of endpoints, automatic call distributors, segments, nodes, and gateways, communication system 30 contemplates any number or arrangement of such components for communicating media.

Figure 2:
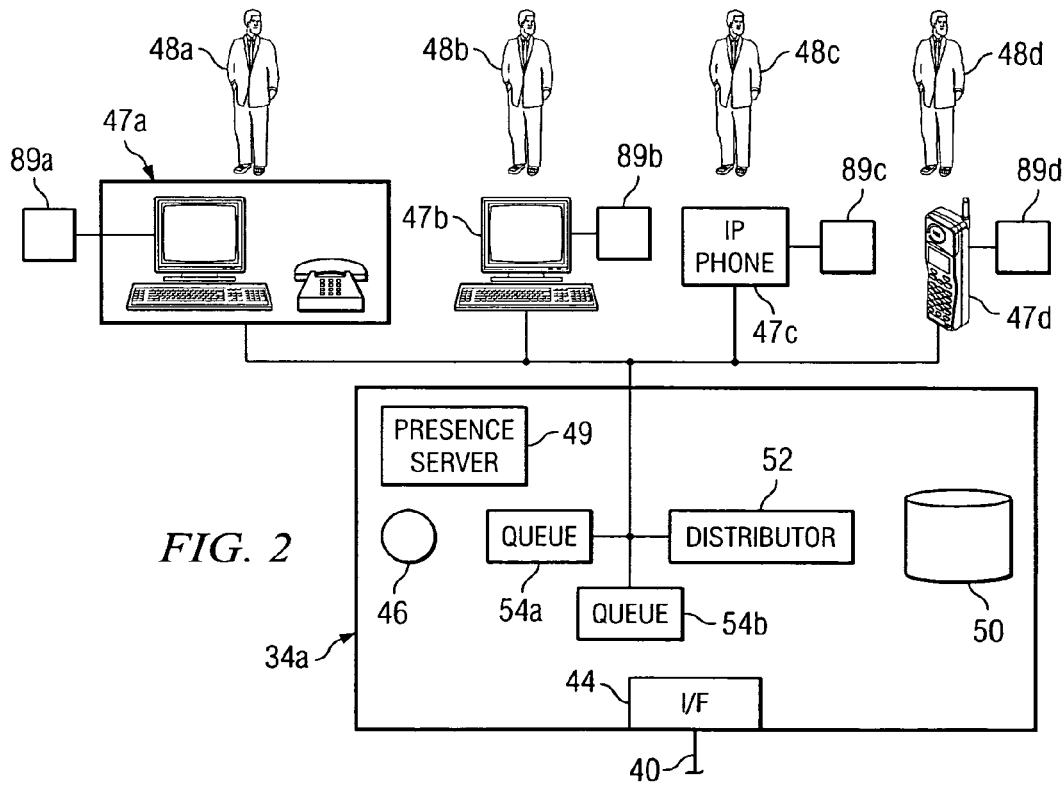
FIG. 2 illustrates an automatic call distributor of FIG. 1 in more detail, illustrating aspects of the present invention.

FIG. 2 illustrates automatic call distributor 34a in more detail, in accordance with a particular embodiment of the present invention. Automatic call distributor 34a includes an interface or input ports 44 which couple automatic call distributor 34a with communication network 36a, using segment 40. When a call is received at automatic call distributor 34a, a processor 46 and presence server 49 are used to determine which of a plurality of agents 48a-48d should receive the call using endpoints 47a-47d, respectively. In doing so, processor 46 may use presence server 49, a memory lookup, a database, or other memory module, such as memory module 50. Processor 46 may be a microprocessor, controller, or any other suitable computing device or resource. Memory module 50 may be any form of volatile or non-volatile memory including, without limitation, magnetic media, optical media, random access memory (RAM), read-only memory (ROM), removable media, or any other suitable local or remote memory component.

Presence server 49 may be any combination of hardware, software and/or encoded logic, and is used to monitor the presence of an agent at an endpoint. Presence server 49 may detect the presence of an agent at an endpoint in association with one or more of presence clients 89a-89d at the agent's endpoint, for example, at the agent's PC, phone, personal digital assistant (PDA) or any other presence client device (e.g., presence clients 89a-89d). The automatic call distributor uses processor 46 to monitor conditions of automatic call distributor 34a, such as the number, type or characteristics of calls in queues 54 or the "state" of each agent. Agents may be placed in various states, such as a "ready" state, a "not ready" state and a "talking" state, according to their current status with respect to the ACD. For example, an agent in a ready state may be ready and able to accept an incoming call distributed by the ACD. Similarly, an agent in a not ready state may be away from his desk or otherwise not ready to accept an incoming call, and an agent in a talking state may currently be communicating on an incoming or outgoing call.

It will be recognized by those of ordinary skill in the art that automatic call distributor 34a may include any number of processors or memory modules to accomplish the functionality and features described herein. The processors 46, memory modules 50, and/or presence server 49 associated with automatic call distributor 34a may be centrally located (local) with respect to one another, or distributed throughout communication network 36a.

If a suitable agent is available to receive the incoming call, a distributor 52 of automatic call distributor 34a distributes the call to such agent for handling. Such handling may comprise, for example, connecting a caller of the call with the suitable agent if the call comprises a voice call or forwarding the call to the suitable agent if the call comprises, for example, an e-mail. If a suitable agent is not available, the call may be placed into a queue 54 in order to wait for an appropriate agent(s). In this embodiment, automatic call distributor 34a has two queues 54; however other embodiments of the present invention may have none, one or more than two queues 54. The selection of which queue 54 to place an incoming call may depend on the type of customer making the call, the type of service requested in the call or any other characteristic or condition relating to the call or automatic call distributor 34a. While a customer is waiting for an agent, automatic call distributor 34a may perform one or more of several functions including data collection from the user, playing of pre-recorded messages, or other automated process. As soon as a suitable agent becomes available, distributor 52 distributes the call to the appropriate agent.

In particular embodiments, presence server 49 may recognize an on-call ready state for an agent if the agent is, at the time, on a call with a lower priority than that of potential incoming calls or is otherwise offhook on a lower priority task. Such a lower priority call may be, for example, a personal, private or otherwise non-business or non-customer-related call. In some cases, an outgoing business call made by an agent may be characterized as a lower priority call. The on-call ready state indicates that the agent is available for receiving incoming customer calls from the ACD (even though the agent may currently be on another call, such as a personal call). Thus, agents who are in the on-call ready state are identified by the ACD as candidates for receiving incoming calls when they are in this specific state. As discussed below, the treatment of agents in an on-call ready state with respect to receipt of incoming calls may vary in different embodiments.

In accordance with one embodiment, ACD 34a, through presence server 49, may transition an agent to an on-call ready state when the agent is in a ready state and then goes offhook to place a call (rather than to answer an incoming call from the ACD). Once the agent in an on-call ready state completes his phone call and hangs up, his state may automatically transition back to the ready state.

In some cases, an ACD may provide an agent with an interface so that the agent can manually transition himself to an on-call ready state from, for example, a not ready state while the agent is on a lower priority call. ACDs may also automatically transition an agent to an on-call ready state based on identification of person with whom the agent is communicating on a lower priority call.

In particular embodiments, ACD 34a may prioritize sending calls to agents that are in a ready state (e.g., phone onhook and ready to receive customer calls) over agents that are in an on-call ready state. For example, the ACD may first send customer calls to all agents in the ready state, and, when there are no more ready state agents, the ACD may start to send calls to agents in the on-call ready state. In some embodiments, the logic and algorithm for identifying agents to which calls may be routed may be either hardcoded or defined by an ACD administrator via a workflow. For example, a routing algorithm may be programmed to distribute calls to an X number of agents in a ready state first (assuming there are X or more agents in that state) and then to Y agents in an on-call ready state.

In some cases, an ACD may send incoming calls to agents in the on-call ready state in the same way the incoming calls may be sent to agents in the ready state. In such cases, once a call is routed by the ACD to the on-call ready agent, the agent's associated endpoint (e.g., the agent's phone) may ring to alert the agent of the incoming call. The agent may then, for example, end his current call that causes him to be in the on-call ready state so that the agent may handle the incoming call distributed to him.

ACD systems may treat ring no answer (RNA) situations in different manners. Some ACD systems may retract a call sent to an agent if the agent does not answer the call after a particular number of rings. In such cases, the retracted call may be transferred to another agent or routed back to an ACD queue. In particular embodiments that utilize such call retraction, ACD 34a may ring an agent in an on-call ready state for an incoming call longer than it would ring an agent in the ready state before retracting the call for rerouting or queue distribution. This may allow the on-call ready agent to finalize their non-business or other lower priority call so that they may answer the incoming call distributed by the ACD.

In some embodiments, ACD 34a may apply different RNA treatment for calls distributed to an agent in the on-call ready state than for calls distributed to an agent in the ready state. As indicated above, some systems may transition agents from a ready state to a not ready state if they fail to answer a call that was routed to them by the ACD. To return to the ready state, the agent may need to press a ready state button on the agent's desktop or otherwise indicate through an ACD interface a desire to transition back to a ready state. In accordance with some embodiments, if an agent who is in the on-call ready state fails to answer a call while the agent is on a private or otherwise lower priority call, the agent's state will be marked as not ready for the duration of the private or low priority call. However, given the fact that the agent is assumed to be at his desk (by virtue of being in the on-call ready state), the system may transition the agent to the ready state as he hangs up on the call.

In yet another embodiment, an agent in an on-call ready state may request to change his state to a "Talking" state and mark the call as a business related un-interruptible, or otherwise not lower priority, call. When in the talking state, the ACD may not attempt to route incoming calls to this agent. It should be understood that particular embodiments may allow an agent to change his state from any supported agent states to and/or from an on-call ready state.

Figure 3:
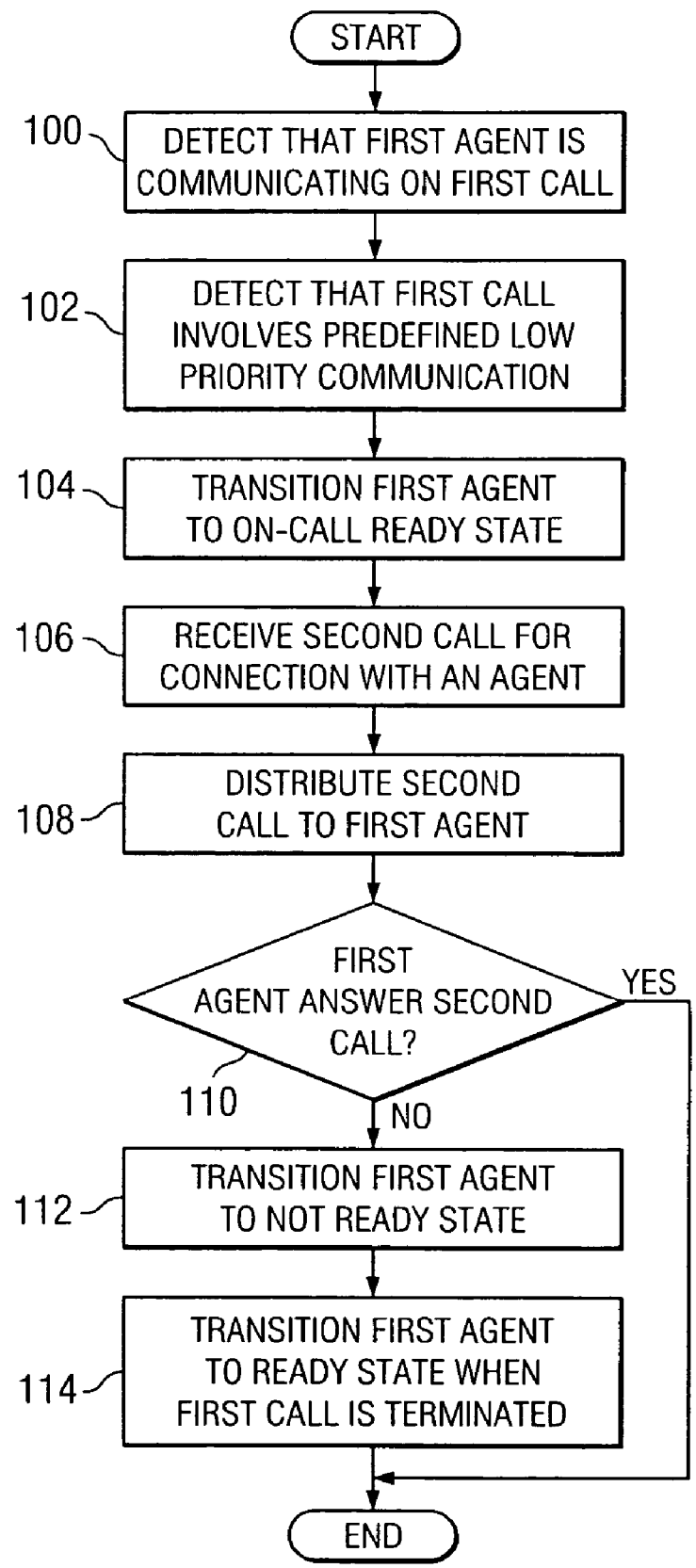
FIG. 3 illustrates a method for automatic call distribution, in accordance with an embodiment of the present invention.

FIG. 3 is a flowchart illustrating a method for automatic call distribution, in accordance with a particular embodiment. The method begins at step 100 where it is detected that a first agent of an automatic call distributor is communicating on a first call. At step 102, it is detected that the first call involves a predefined low priority communication. Such a predefined low priority communication may comprise, for example, a personal call, a non-business related call or an outgoing business call made by the agent. Low priority calls may be defined as such according to particular needs or circumstances. The detection that the first call involves a predefined low priority communication may be made through an indication received from the agent (e.g., by the agent pressing a button on the agent's phone) that the call involves a predefined low priority communication or automatically through, for example, identification of the person with whom the first agent is communicating on the first call. Such identification may be made, for example, through caller ID technology. In some cases, the detection that the first call involves a predefined low priority communication may be made by receiving a command from the first agent to transition the first agent to an on-call ready state.

At step 104, the first agent is transitioned to an on-call ready state. The on-call ready state indicates that the first agent is ready to receive incoming calls to the automatic call distributor while communicating on the first call. Such calls may be from customers of the administrator of the automatic call distributor. At step 106, a second call is received, for example from a customer, for connection with an agent.

At step 108, the second call is distributed to the first agent. Such distribution may include alerting the first agent of the second call using a ring. It should be understood that in some cases, such a received second call may be distributed to other agents in a ready state before distribution to an agent in an on-call ready state, such as the first agent.

At step 110, it is determined whether the first agent answers the second call. If it is determined at step 110 that the first agent answers the second call, the method ends. If the first agent does not answer the second call (e.g., after ringing for a certain period of time), the method proceeds to step 112 where the first agent is transitioned to a not ready state indicating that the first agent is not ready to receive additional incoming calls while on the first call. At step 114, the first agent is transitioned to a ready state when the first call is terminated.

Some of the steps illustrated in FIG. 3 may be combined, modified or deleted where appropriate, and additional steps may also be added to the flowchart. Additionally, steps may be performed in any suitable order without departing from the scope of the invention.

As indicated above, technical advantages of particular embodiments of the present invention include the use of an on-call ready state to indicate that an agent is ready to receive and handle incoming calls despite currently communicating on another, lower priority call. Moreover, call distribution may be prioritized to agents in a ready state first and then to agents in the on-call ready state. Accordingly, agent availability and productivity may be increased thus saving time and labor expense as agents communicating on non-business or personal calls may remain available to receive and handle customer or business-related calls. In addition, a longer RNA time may be implemented for agents in the on-call ready state. An agent in the on-call ready state may be transitioned back to a ready state once the agent's lower priority call is terminated, even if the agent failed to answer an incoming call distributed to him when he was in the on-call ready state. In addition, an agent may personally set his state to an on-call ready state when he initiates or receives a lower priority call.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30 and automatic contact distributor 34a, these elements may be combined, rearranged or positioned in order to accommodate particular routing architectures or needs. In addition, any of these elements may be provided as separate external components to communication system 30, automatic contact distributor 34a or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for automatic call distribution, comprising:
   detecting that a first agent is communicating on a first call;
   detecting that the first call involves a predefined low priority communication;
   transitioning the first agent to an on-call ready state based on the first call, the on-call ready state indicating that the first agent is ready to receive an additional call while communicating on the first call; and comprising receiving a command from the first agent through an agent interface to transition the first agent from the on-call ready state to a talking state, the talking state indicating that the first agent is communicating on a high priority call and is not able to receive additional incoming calls while communicating on the high priority call.

2. An automatic call distribution system, comprising:
a presence server operable to detect that a first agent is communicating on a first call;
a processor operable to detect that the first call involves a predefined low priority communication;
the presence server operable to transition the first agent to an on-call ready state based on the first call, the on-call ready state indicating that the first agent is ready to receive an additional call while communicating on the first call; and
wherein the presence server is operable to receive a command from the first agent through an agent interface to transition the first agent from the on-call ready state to a talking state, the talking state indicating that the first agent is communicating on a high priority call and is not able to receive additional incoming calls while communicating on the high priority call.

3. An automatic call distribution system, comprising:
means for detecting that a first agent is communicating on a first call;
means for detecting that the first call involves a predefined low priority communication;
means for transitioning the first agent to an on-call ready state based on the first call, the on-call ready state indicating that the first agent is ready to receive an additional call while communicating on the first call; and
further comprising means for receiving a command from the first agent through an agent interface to transition the first agent from the on-call ready state to a talking state, the talking state indicating that the first agent is communicating on a high priority call and is not able to receive additional incoming calls while communicating on the high priority call.

4. Logic embodied in a non-transitory computer readable medium, the computer readable medium comprising code operable to:
detect that a first agent is communicating on a first call;
detect that the first call involves a predefined low priority communication;
transition the first agent to an on-call ready state based on the first call, the on-call ready state indicating that the first agent is ready to receive an additional call while communicating on the first call; and
wherein the code is further operable to receive a command from the first agent through an agent interface to transition the first agent from the on-call ready state to a talking state, the talking state indicating that the first agent is communicating on a high priority call and is not able to receive additional incoming calls while communicating on the high priority call.

5. A method for automatic call distribution, comprising:
detecting that a first agent is communicating on a first call, the first call comprising a non-business call;
receiving an indication from the first agent through an agent interface that the first call involves a predefined low priority communication;
transitioning the first agent to an on-call ready state based on the first call, the on-call ready state indicating that the first agent is ready to receive an additional call while communicating on the first call;
receiving a second call for connection with an agent;
alerting the first agent of the second call through an on-call ready ring, the on-call ready ring extending for a longer period of time than a ring alerting a ready agent of an incoming call when the ready agent is not in the on-call ready state;
automatically transitioning the first agent to a not ready state if the first agent does not answer the second call, the not ready state indicating that the first agent is not ready to receive an incoming call; and
automatically transitioning the first agent from the not ready state to a ready state when the first call is terminated.

6. An automatic call distribution system, comprising:
a presence server operable to:
detect that a first agent is communicating on a first call, the first call comprising a non-business call;
receive an indication from the first agent through an agent interface that the first call involves a predefined low priority communication; and
transition the first agent to an on-call ready state based on the first call, the on-call ready state indicating that the first agent is ready to receive an additional call while communicating on the first call;
a processor operable to:
receive a second call for connection with an agent; and
alert the first agent of the second call through an on-call ready ring, the on-call ready ring extending for a longer period of time than a ring alerting a ready agent of an incoming call when the ready agent is not in the on-call ready state; and
the presence server operable to:
automatically transition the first agent to a not ready state if the first agent does not answer the second call, the not ready state indicating that the first agent is not ready to receive an incoming call; and
automatically transition the first agent from the not ready state to a ready state when the first call is terminated.

7. Logic embodied in a non-transitory computer readable medium, the computer readable medium comprising code operable to:
detect that a first agent is communicating on a first call, the first call comprising a non-business call;
receive an indication from the first agent through an agent interface that the first call involves a predefined low priority communication;
transition the first agent to an on-call ready state based on the first call, the on-call ready state indicating that the first agent is ready to receive an additional call while communicating on the first call;
receive a second call for connection with an agent;
alert the first agent of the second call through an on-call ready ring, the on-call ready ring extending for a longer period of time than a ring alerting a ready agent of an incoming call when the ready agent is not in the on-call ready state;
automatically transition the first agent to a not ready state if the first agent does not answer the second call, the not ready state indicating that the first agent is not ready to receive an incoming call; and
automatically transition the first agent from the not ready state to a ready state when the first call is terminated.

8. The method of claim 1, further comprising receiving from the first agent an indication that the first call is a high priority call.

9. The method of claim 1, wherein detecting that the first call involves a predefined low priority communication comprises automatically detecting that the first call involves a predefined low priority communication.

10. The method of claim 1, wherein the first call comprises a non-business call.

11. The method of claim 1, further comprising automatically transitioning the first agent from the talking state to a ready state when the high priority call is terminated.

12. The method of claim 1, further comprising:
receiving the high priority call while the first agent is communicating on the first call in the on-call ready state; and
distributing the high priority call to the first agent.

13. The system of claim 2, wherein the presence server is further operable to receive from the first agent an indication that the first call is a high priority call.

14. The system of claim 2, wherein a processor operable to detect that the first call involves a predefined low priority communication comprises a processor operable to automatically detect that the first call involves a predefined low priority communication.

15. The system of claim 2, wherein the first call comprises a non-business call.

16. The system of claim 2, wherein the presence server is further operable to automatically transition the first agent from the talking state to a ready state when the high priority call is terminated.

17. The system of claim 2, wherein the processor is further operable to:
receive the high priority call while the first agent is communicating on the first call in the on-call ready state; and
distribute the high priority call to the first agent.

18. The medium of claim 4, wherein the code is further operable to receive from the first agent an indication that the first call is a high priority call.

19. The medium of claim 4, wherein code operable to detect that the first call involves a predefined low priority communication comprises code operable to automatically detect that the first call involves a predefined low priority communication.

20. The medium of claim 4, wherein the first call comprises a non-business call.

21. The medium of claim 4, wherein the code is further operable to automatically transition the first agent from the talking state to a ready state when the high priority call is terminated.

22. The medium of claim 1, wherein the code is further operable to:
receive the high priority call while the first agent is communicating on the first call in the on-call ready state; and
distribute the high priority call to the first agent.

* * * * *